April 1, 1969 J. M. BARRETT 3,436,741

NOISE CANCELLING ARRANGEMENTS FOR MAGNETIC WIRE MEMORIES

Filed Aug. 10, 1964

INVENTOR.
JOHN M. BARRETT
BY C. A. Gulbrandsen
ATTY.

United States Patent Office 3,436,741
Patented Apr. 1, 1969

3,436,741

NOISE CANCELLING ARRANGEMENTS FOR MAGNETIC WIRE MEMORIES

John M. Barrett, Northlake, Ill., assignor to Automatic Electric Laboratories, Inc., Northlake, Ill., a corporation of Delaware Filed Aug. 10, 1964, Ser. No. 388,388
Int. Cl. G11b 5/00
U.S. Cl. 340—174 4 Claims

ABSTRACT OF THE DISCLOSURE

The magnetic storage wires of a magnetic memory and their return conductors form transmission lines which are balanced so that the incident and reflected noise waves which are incrementally generated along a transmission line are combined and cancelled at the input to the sense amplifier.

This invention relates to magnetic memories, and particularly to arrangements for cancelling noise due to access currents.

Magnetic storage devices with which the invention is primarily concerned are in the form of an elongated magnetic storage device or magnetic wire. Such devices have bistable magnetic characteristics which may be advantageously employed to store information in the form of a binary "1" and a binary "0." These storage devices have become well known in the art as twistors. The twistor may take various forms, several of which are described by A. H. Bobeck in the article "A New Storage Element For Large-Sized Memory Arrays—The Twistor," Bell System Technical Journal, Volume XXXVI, November 1957 and in his U.S. Patent 3,083,353. Generally speaking, the twistor has a helical magnetic flux path, the polarization of which corresponds to its bistable magnetic remanent states. The binary digits "1" and "0" can be stored in various locations along a twistor by placing the locations in one or the other direction of magnetic polarization.

The magnetic field required to switch a bit location from one magnetic state to another may be provided by the sum of several magnetic fields or may be provided by a single magnetic field. It has been found advantageous to employ two magnetic fields, each of which is insufficient to effect magnetization, in coincidence to write into a magnetic wire memory and a single field of sufficient strength to read from the memory. Reading fields are provided by selectively energizing word solenoids which are spaced apart along a plurality of twistors. Also, approximately one-half of the writing field is provided by an opposite and lesser energization of the word solenoids. The remainder of the write field is supplied by utilizing the twistor as an access line. A half-write current, hereinafter called the digit current, is employed to energize the twistor for the remainder of the write field. Additionally, the twistor itself may be advantageously employed as the sensing line since the twistor in its most widely used form has a built-in sense conductor.

A problem exists in the type of memory just-described since signal detection apparatus is connected in circuit with the driving apparatus and storage medium during the writing operation. The digit current through the twistor, relatively large with respect to the output signals, overloads the signal detecting apparatus which therefore requires a certain amount of recovery time in order to properly detect the output signals. The leading and trailing edges of the digit pulse effect transients which increase the required recovery time. An increase in recovery time is of course undesirable since the effect is to increase the read-write cycle time of the system.

D. C. Weller in his U.S. Patent 3,000,004 describes isolation of the sense amplifiers from the digit current signals by employing a return conductor connected essentially in parallel to the twistor wire; one end of each is terminated at ground through the primary winding of a center-tapped transformer, the secondary of which is connected to the sense amplifier. Both the twistor circuit and the return conductor circuit are balanced, impedance wise, to the driving apparatus to prevent echo effects. W. B. Gaunt, Jr. in his U.S. Patent 3,137,843 describes a similar arrangement where one end of the twistor-return wire combination is short circuited and the digit current apparatus and the sensing apparatus is connected at the other end. The read-write cycle time is enhanced by driving the circuit via equal resistances to decrease the circuit time constant; echo effects and impedance peaks being prevented by limiting the maximum twistor length to less than $\lambda/4$ of the highest frequency in the output signal having significant amplitude.

The present invention provides other arrangements for eliminating transient noise caused by the leading edge and the trailing edge of the digit current pulse. If the transient from the trailing edge of a digit current pulse can be minimized or eliminated, the cycle time of the memory can be decreased.

It is a major object of the invention to provide an improved magnetic memory system.

Another object of the invention is to improve the signal to noise ratio of magnetic memory system.

Another object of the invention is to improve the cycle time of memory systems.

The foregoing and other objects of the invention are achieved in two embodiments; one embodiment being suitable for short lengths of twistor; and the other embodiment being suitable for long or short lengths of twistor. Each of these embodiments bring out characteristics of the twistor and the return conductor which correspond to similar characteristics in transmission lines. Each of these embodiments utilizes the incident and reflected waves to provide at a certain point along the transmission line a potential difference thereacross that is substantially zero, and hence, a load connected at that point would for all practical purposes be dissipationless.

Probably the most critical time area of the read-write cycle is the time between the trailing edge of a write pulse and the leading edge of the next read pulse. Each of the above embodiments provides a minimum noise signal to the signal detecting apparatus for a minimum amount of time.

A feature of the invention resides in the parallel connection of two series circuits each including a twistor and a return conductor.

It is another feature of the invention that two elongated magnetic storage devices be connected in series and two electrical conductors be connected in series, and that the two magnetic devices and two electrical conductors be then connected in parallel.

It is another feature of the invention to connect two magnetic storage devices in series, two electrical conductors in series, the combination of magnetic devices and electrical conductors in parallel and to balance at its midpoint.

Other objects and features of the invention will be apparent and the invention will be best understood by reference to the following description taken in conjunction with the accompanying drawings.

Figure 1:
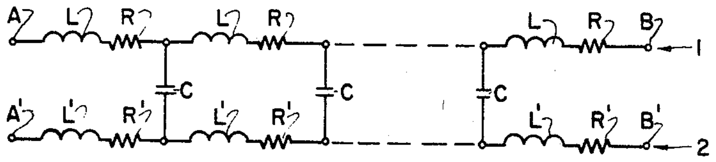
FIG. 1 is an equivalent circuit drawing of a transmission line including an elongated magnetic storage device and a return conductor.

FIG. 1 describes the distributed inductance L between the terminals A, B of a twistor and the distributed inductance L′ between the terminals A′, B′ of a return conductor. Inductance L is greater than inductance L′. Also shown in FIG. 1 is the distributed capacitance C and the distributed resistance R which for all practical purposes is the same for the twistor and the return conductor.

Figure 2:
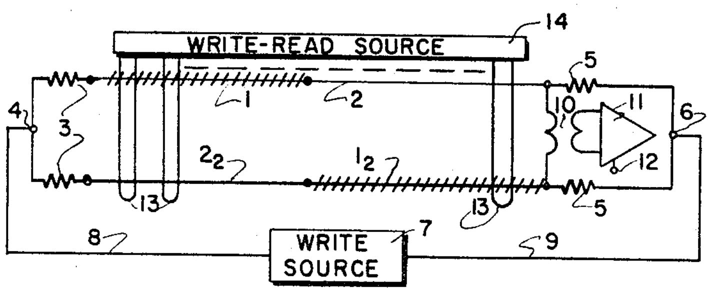
FIG. 2 is a schematic represetation of an embodiment of the invention.
Figure 3:
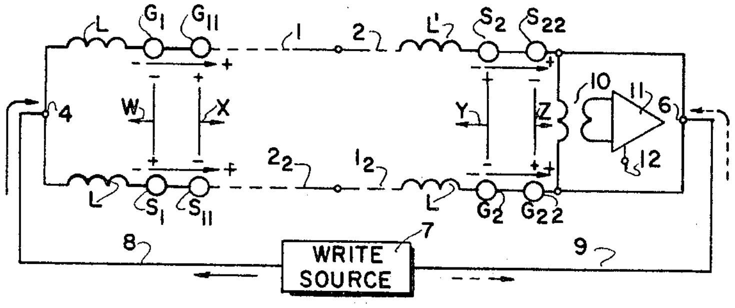
FIG. 3 is an equivalent circuit diagram of FIG. 2.

FIG. 2 describes an embodiment of the invention that is suitable for shot lengths of twistor. In FIG. 2 a twistor 1 is connected in series with a return conductor 2 and a twistor $\mathbf{1_2}$ is connected in series with a return conductor $\mathbf{2_2}$. It is desirable that elements 1, 2 have the same total impedance as elements $\mathbf{1_2}$, $\mathbf{2_2}$.The two twistor-return conductor circuits are connected in parallel at points 4 and 6 through resistances 3 and 5 which prevent short circuits of the output signal and decrease the circuit time constant. Junctions 4 and 6 are connected by preferably equal length conductors 8 and 9 to an energy source 7, which may be called a digit driver. A transformer 10 couples the output signal to the sense amplifier 11 which may be of a type adapted to be strobed as referenced by its input 12. Solenoids 13 define bit locations along the memory devices and are energized for reading and writing by source 14. FIG. 3 is a more detailed equivalent circuit with solenoid apparatus and distributed parameters removed and will be described below.

Figure 4:
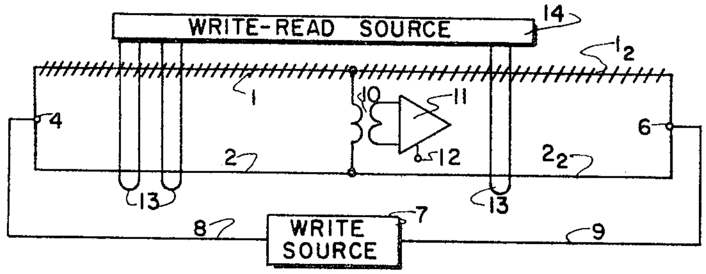
FIG. 4 is another embodiment of the invention.
Figure 5:
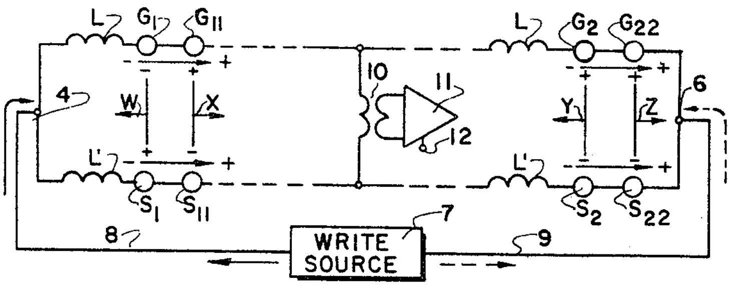
FIG. 5 is an equivalent circuit diagram of FIG. 4.

FIG. 4 describes an arrangement that is preferred for long lengths of twistor. In FIG. 4 twistors 1 and $\mathbf{1_2}$ are serially connected and return conductors 2 and $\mathbf{2_2}$ are serially conducted, the two series circuits then being connected in parallel at junctions 4 and 6. As in FIG. 2, points 4 and 6 are connected by way of preferably equal length conductors to the energy source 7. A transformer 10 at the mid point of the transmission line so formed couples the output signal to the sense amplifier 11 which is adapted to be strobed input at 12. As in FIG. 2, solenoids 13 define bit locations along the memory devices. FIG. 5 is a more detailed equivalent circuit of FIG. 4 and will be described below.

Since a more critical area in the read-write cycle is at the time the trailing edge of a write pulse occurs, the following description will be directed to that particular time; however, a similar action takes place at the beginning of the digit pulse as can be easily determined from the following description.

Referring to FIGS. 2 and 3 and assuming that a digit pulse has been applied and that the transmission line has reached a steady state, let us look at the transmission line at the time when the digit current pulse reaches its trailing edge. Also, assume that the energy from source 7 has entered the transmission line at junction 4 (solid arrow) and at junction 6 (broken arrow) as the same time and has propagated toward the mid point of the transmission line and that energy source 14 is operative in coincidence with source 7. Further assume that a similar energy transfer will happen at the trailing edge of the impulse, that is, junctions 4 and 6 will experience the trailing edge of the pulse before the remainder of the transmission line.

Referring particularly to FIG. 3, when the digit current ceases each incremement of the transmission line will act as a plurality of small generators from the ends toward the center of the transmission line. To illustrate the difference in signal delay characteristics, two small generators $G_1$, $G_{11}$ have been included along with the first left hand increment of distributed inductance L in twistor 1. Similarly, generators $S_2$, $S_{22}$ have been shown for the distributed inductance L′ in the conductor 2 at the right hand ence in signal delay characteristics, two small generators $G_2$, $G_{22}$, $S_1$, and $S_{11}$ have been illustrated in the lower portion of the transmission line in twistor $\mathbf{1_2}$ and conductor $\mathbf{2_2}$, respectively. Since the delay is larger for the larger inductance, generators G are of less instantaneous value than generators S. Immediately prior to the end of the digit current pulse the entire transmission line is in a steady state and all portions of the line, when balanced as much as possible, are at substantially the same potential. This potentail exists at the mid points beween each of the illustrated generator pairs. Therefore, we may look at vertically opposed pairs of the generators as indicating the polarity of a wave traversing the transmission line. These waves for each succeeding inward increment may be viewed as follows: wave Z traverses the transmission line toward the right to the primary winding of transformer 10; wave X traverses the transmission line toward the right to the primary of transformer 10; wave Y traverses the transmission line from right to left, reverses polarity at junction 4, and traverses the transmission line right to left to the primary of transformer 10; wave W traverses the transmission line from right to left, reverses polarity at junction 4, and traverses the transmission line from left to right to the primary winding of transformer 10. It can easily be seen from the polarities indicated for waves W, X, Y and Z that for short transmission lines these waves will effectively cancel each other at the primary winding of transformer 10 and therefore prevent saturation of the sense amplifier 11. For short lengths of twistor and return wire this embodiment of the invention will substantially eliminate noise due to transients caused by the digit drive currents.

Referring now to FIGS. 4 and 5, a preferred embodiment is shown for long lengths of twistor and return wire. The same assumptions will be made for the description of FIGS. 4 and 5 as made for FIGS. 2 and 3. It should be noted that the twistor and return conductor are now balanced on each side of the output signal detecting apparatus.

As in the previous embodiment, generators G and S are effected for each inwardly succeeding increment of the transmission line at the time of the trailing edge of the digit pulse. Similar polarities and waves are shown to illustrate the condition at the primary of transformer 10 at that time. These waves for each increment of the transmission line traverse the line to the primary winding of transformer 10, for example; wave W traverses the transmission line first right to left, reverses polarity at junction 4, then traverses the transmission line toward the primary winding of transformer 10; wave Y traverses the trasmission line from right to left toward the primary winding of transformer 10; and wave Z traverses the transmission line first toward the right, reverses polarity at junction 6, then traverses the transmission line toward the left to the primary winding of transformer 10. It can be seen that in this embodiment for each increment of the transmission line there is a wave X on the left hand side of the transmission line and an opposite polarity wave Y on the right hand side of the transmission line which, with a center balanced transmission line must traverse the same electrical distance to the primary winding of transformer 10. Also, for each wave W on the left hand side of the transmission line there is an equal and opposite polarity wave Z on the right hand side of the transmission line, both of which must traverse the same electrical distance to the primary winding of transformer 10. Therefore, the center balanced transmission line of FIGS. 4 and 5 provides near perfect cancellation of noise due to digit currents.

It should be noted that although the foregoing description referred to two separate twistors 1, $\mathbf{1_2}$ and two separate return conductors 2, $\mathbf{2_2}$ a single twistor and a single return conductor could be used for the embodiment described in FIGS. 4 and 5. It should be noted further that it is easier to center balance such an arrangement of twistor and return conductor with the same amplifier apparatus at the center than it is to balance two series circuits such as shown in FIGS. 2 and 3. These circuits can be looked at as balanced bridge circuits with a preferred null at the transformer primary winding.

The embodiment shown in FIGS. 4 and 5 may also be used on short lengths of twistor. The embodiment of FIGS. 2 and 3 can only be used for short lengths of twistor since as the length of the transmission line increases the delays between the waves since the potentials generated at the ends of the transmission line are further and further out of phase and a widening of the cancellation time becomes a problem.

What is claimed is:

1. In a magnetic memory system of the type comprising elongated magnetic storage means, electrical return conductor means, a circuit including a signal source for writing into said magnetic storage means, said circuit extending over said magnetic storage means and said return conductor means in parallel, and means for reading information out of said magnetic storage means and including sensing apparatus connected between said magnetic storage means and said electrical conductor means, the improvement that said magnetic storage means comprises a plurality of magnetic-storage-wire sections of equal length, that said return conductor means comprises a plurality of return-conductor sections of equal length, and that said sensing apparatus is connected across two points of equal potential of a bridge circuit, each of the two arms of said bridge circuit on one side of said equal potential points comprising a series combination of magnetic-storage-wire and return-conductor sections.

2. The improvement in a memory system according to claim 1 and further comprising resistance means serially connected in circuit with each said magnetic-storage-wire and return-conductor combination.

3. In a magnetic memory system of the type comprising elongated magnetic storage means, electrical return conductor means, a circuit including a signal source for writing into said magnetic storage means, said circuit extending over said magnetic storage means and said return conductor means in parallel, and means for reading information out of said magnetic storage means and including sensing apparatus connected between said magnetic storage means and said electrical conductor means, the improvement that said magnetic storage means comprises a plurality of magnetic-storage-wire sections of equal length, that said return conductor means comprises a plurality of return-conductor sections of equal length, and that said sensing apparatus is connected across two points of equal potential of a bridge circuit, one arm of said bridge circuit on each side of said equal potential points comprising a magnetic-storage-wire section and the other arm of said bridge circuit on each side of said equal potential points comprising a return-conductor section.

4. The improvement in a memory system according to claim 3, and further comprising transformer means connected between said points of equal potential and said sensing apparatus.

References Cited

UNITED STATES PATENTS

| | | | |
|---|---|---|---|
| 3,137,843 | 6/1964 | Gaunt | 340—174 |
| 3,144,641 | 8/1964 | Raffel | 340—174 |
| 3,209,337 | 9/1965 | Crawford | 340—174 |
| 3,293,622 | 12/1966 | Pricer et al. | 340—174 |
| 3,303,481 | 2/1967 | Kessler | 340—174 |
| 3,319,233 | 5/1967 | Amemiya et al. | 340—174 |

BERNARD KONICK, *Primary Examiner.*

BARRY L. HALEY, *Assistant Examiner.*